United States Patent
Terrats Bes et al.

(10) Patent No.: US 11,642,201 B2
(45) Date of Patent: May 9, 2023

(54) CAP PART FOR DENTAL SCANNING

(71) Applicant: TERRATS MEDICAL, S.L., Barberà del Vallès (ES)

(72) Inventors: Jordi Terrats Bes, Barcelona (ES); Ramon Terrats Bes, Sant Quirze Del Valles (ES); Manuel Gomez Collantes, Barberà Del Vallès (ES)

(73) Assignee: Terrats Medical, S.L., Barbera Del Vallès (ES)

( * ) Notice: Subject to any disclaimer, the term of this patent is extended or adjusted under 35 U.S.C. 154(b) by 679 days.

(21) Appl. No.: 16/587,938

(22) Filed: Sep. 30, 2019

(65) Prior Publication Data
US 2020/0100876 A1    Apr. 2, 2020

(30) Foreign Application Priority Data

Oct. 1, 2018   (ES) .............................. ES201831484U (51) Int. Cl.
*A61C 8/00*        (2006.01)
(52) U.S. Cl.
CPC .......... *A61C 8/0054* (2013.01); *A61C 8/0066* (2013.01); *A61C 8/0069* (2013.01)
(58) Field of Classification Search
CPC .... A61C 8/0054; A61C 8/0066; A61C 8/0069
See application file for complete search history.

(56) References Cited

U.S. PATENT DOCUMENTS

| 4,575,340 | A |   | 3/1986  | Lustig |
|-----------|---|---|---------|--------|
| 5,114,343 | A | * | 5/1992  | Musikant ............. A61C 8/0057 433/169 |
| 5,564,924 | A | * | 10/1996 | Kwan ................... A61C 8/005 433/175 |
| 5,755,574 | A | * | 5/1998  | D'Alise ............... A61C 8/0001 433/173 |

(Continued)

FOREIGN PATENT DOCUMENTS

| WO | 0004842  A1 | 2/2000 |
| WO | 03030768 A1 | 4/2003 |

(Continued)

OTHER PUBLICATIONS

Communication dated Dec. 13, 2019 from the European Patent Office in 19382825.

*Primary Examiner* — Nicholas D Lucchesi
*Assistant Examiner* — Hao D Mai
(74) *Attorney, Agent, or Firm* — Sughrue Mion, PLLC (57) ABSTRACT

A cap part (1) placed on an interface (100) or on an attachment to act jointly as a scanning post. The cap part has a cavity (2) for housing at least one cylindrical portion (101) with a circular base of the interface or of the attachment. The cap part is configured by a single body having an upper portion (11) formed by a solid head (3) without holes or notches, and a lower portion (12) provided with a longitudinal blind hole forming the cavity (2). The blind hole has a retaining segment (4), the inner wall of which is partially or entirely formed by a concave, cylindrical retaining sur- (Continued)

face (40) with an elliptical or oval-shaped base for retaining by embedding an essentially cylindrical portion (101) of the interface (100) or of the attachment.

8 Claims, 6 Drawing Sheets

(56) References Cited

U.S. PATENT DOCUMENTS

| | | | | |
|---|---|---|---|---|
| 5,759,036 | A * | 6/1998 | Hinds | A61C 8/0066 433/172 |
| 5,947,736 | A * | 9/1999 | Behrend | A61C 8/0001 433/172 |
| 6,030,219 | A * | 2/2000 | Zuest | A61C 13/2656 433/172 |
| D441,448 | S * | 5/2001 | Kumar | D24/156 |
| 6,824,386 | B2 * | 11/2004 | Halldin | A61C 8/0001 433/173 |
| 8,002,547 | B2 * | 8/2011 | Porter | A61C 8/0001 433/214 |
| 8,007,279 | B2 * | 8/2011 | Bassett | A61C 8/0006 433/172 |
| 8,075,313 | B2 * | 12/2011 | Ranck | A61C 8/0001 433/172 |
| 8,632,336 | B2 * | 1/2014 | Rossler | A61C 8/0025 433/201.1 |
| 8,920,170 | B2 * | 12/2014 | Krivoruk | A61C 13/0001 433/172 |
| 9,265,591 | B1 * | 2/2016 | Gittleman | A61C 8/0053 |
| 10,507,084 | B2 * | 12/2019 | Costa Codina | A61C 8/0048 |
| 2002/0177103 | A1 * | 11/2002 | Pelak | A61C 13/2656 433/169 |
| 2004/0101806 | A1 * | 5/2004 | Kumar | A61C 8/0001 433/172 |
| 2004/0241610 | A1 * | 12/2004 | Hurson | A61C 8/008 433/173 |
| 2005/0266381 | A1 * | 12/2005 | Abarno | A61C 8/0018 433/173 |
| 2006/0003290 | A1 * | 1/2006 | Niznick | A61C 8/0022 433/174 |
| 2006/0183078 | A1 * | 8/2006 | Niznick | A61C 8/0066 433/173 |
| 2006/0228672 | A1 * | 10/2006 | Hurson | A61C 8/0001 433/173 |
| 2006/0269903 | A1 * | 11/2006 | Bulard | A61C 8/0065 433/173 |
| 2006/0275735 | A1 * | 12/2006 | Bulard | A61C 8/0075 433/174 |
| 2007/0037123 | A1 * | 2/2007 | Mansueto | A61C 8/0022 433/173 |
| 2007/0072150 | A1 * | 3/2007 | Mansueto | A61C 8/0066 433/174 |
| 2007/0281279 | A1 * | 12/2007 | Chander | A61C 8/0001 433/173 |
| 2008/0032263 | A1 * | 2/2008 | Bondar | A61C 8/0001 433/141 |
| 2008/0153067 | A1 * | 6/2008 | Berckmans | A61C 8/0089 433/213 |
| 2008/0233539 | A1 * | 9/2008 | Rossler | A61C 8/0001 433/174 |
| 2010/0119993 | A1 * | 5/2010 | Schulter | A61C 8/0077 433/215 |
| 2010/0209877 | A1 * | 8/2010 | Hogan | A61C 8/0001 433/214 |
| 2013/0196290 | A1 * | 8/2013 | Herrington | A61C 8/0068 433/173 |
| 2013/0309632 | A1 * | 11/2013 | Sanders | A61C 8/0053 433/173 |
| 2014/0205969 | A1 * | 7/2014 | Marlin | A61C 8/0068 433/196 |
| 2015/0173864 | A1 * | 6/2015 | Pomeranitz | A61C 8/006 433/201.1 |
| 2016/0008104 | A1 * | 1/2016 | Terrats Triquell | A61C 8/0054 433/173 |
| 2016/0045290 | A1 * | 2/2016 | Poovey | A61C 8/0001 433/201.1 |
| 2016/0213451 | A1 * | 7/2016 | Burger | A61C 13/0003 |
| 2017/0112598 | A1 * | 4/2017 | Suttin | A61C 8/005 |
| 2017/0296307 | A1 * | 10/2017 | Simmons | A61C 8/0068 |
| 2017/0333163 | A1 | 11/2017 | Terrats Bes et al. | |
| 2018/0200030 | A1 * | 7/2018 | Fan | A61C 8/0001 |
| 2018/0228578 | A1 * | 8/2018 | Liston | A61C 8/008 |
| 2018/0338818 | A1 * | 11/2018 | Sarig | A61C 8/0074 |
| 2020/0205944 | A1 * | 7/2020 | Liston | A61C 8/0093 |
| 2021/0282901 | A1 * | 9/2021 | Calvat | A61C 9/0046 |

FOREIGN PATENT DOCUMENTS

| | | | | |
|---|---|---|---|---|
| WO | WO-2008022635 A2 * | 2/2008 | | A61C 8/0022 |
| WO | WO-2010049135 A1 * | 5/2010 | | A61C 8/0013 |
| WO | 2017141087 A1 | 8/2017 | | |

* cited by examiner

CAP PART FOR DENTAL SCANNING

TECHNICAL FIELD OF THE INVENTION

The present invention relates to a cap part for dental scanning which when placed on a dental abutment or on a dental attachment acts jointly with the abutment or with the attachment as a scanning post.

The cap part is provided with a cavity for housing at least one essentially cylindrical portion with a circular base of the abutment or of the dental attachment. Generally, this essentially cylindrical portion of the abutment or of the attachment is the hollow cylindrical upper portion which forms the shaft in an abutment or in an attachment with a short shaft, and in the abutments or attachments with a long shaft which is formed by an upper hollow cylinder and by an intermediate hollow cylinder with a diameter larger than the upper one, the essentially cylindrical portion which is housed in said cavity is the intermediate hollow cylinder.

Thus, the assembly formed by the abutment (or attachment) and the cap part placed on the upper portion of the abutment (or attachment) acts as a dental scanning post, the kind that is mounted and fixed to a dental implant or the implant replica.

BACKGROUND OF THE INVENTION

The results of the scanning technique are commonly used as a basis for the processes for designing and manufacturing dental prostheses in implant applications. Thus, one way to perform the scanning consists of placing scannable or scanning posts, directly fixed on the implant anchored in the jaw of the patient, performing the scanning intraorally. Scanning can also be performed outside of the intraoral cavity, for example, on reproductions of jaws with implant replicas, with laboratory scanning posts, and in specific cases scanning can be performed on attachments or posts.

There are many models of scannable posts on the market, with numerous criteria as to material, surface roughness, colour, size and geometry, usually being differentiated for each of the two application groups indicated previously.

The basic criterion that the aforementioned scanning posts must comply with is to provide information as accurate as possible with regards to:
- the spatial position of the implant, or of the replica thereof, with respect to the jaw and with respect to the maxilla;
- the angulation of the implant, or of the replica thereof, with respect to the reference plane; and
- the position of the anti-rotational geometric figure or the anti-rotation means of the implant, in the radial direction, for which the implants are usually provided with a flat face or surface, substantially parallel to the axis thereof and asymmetrical.

Furthermore, the scanning posts must produce the least amount of distortion possible in the scanned image, meaning, avoiding bright spots in the images obtained, noise, or any other undesirable phenomenon that causes them.

Since a scanning post must be designed and manufactured such that it can be fixed on the implant or, if necessary, on the replica of the implant for which it is intended in a secure manner, these posts are commonly screwed to the support, whether it be an implant or a replica thereof. Obviously, the use of a screw means that the body of the scanning post provides said access to the screw through the same up to the threaded area of the implant or that of the replica, this type of scanning post being provided with a through hole crossing through it in the direction of the longitudinal axis thereof.

In practice, it has been shown that the access for the screw produces some noise and distortion during scanning, which is a serious drawback and significantly reduces the quality of the images and measurements obtained, which are performed beforehand and are necessary for the design of the prosthesis. Moreover, the most critical measurement area in many of the prosthetic restoration procedures occurs at the apical end of the scanning post, which is used as a reference to measure the height positioning of the implant to which it is connected, producing an error which can be very relevant depending on the situation and makes it impossible for a good, stress-free placement of the mentioned prosthesis on the implants.

From patent ES2583904, a dental scanning post is known, adapted for mounting and fixing on a dental implant provided with anti-rotation means and an inner screwed opening, or to a replica of the implant. The post comprises a main body provided with an indicator of the angular position and connection means to connect to the implant or to the replica thereof arranged in a lower segment of the main body, and fixing means for fixing to the implant formed by a fixing shaft and by an end head arranged at the upper end of the fixing shaft, wherein the head has an external surface, oriented in opposition to the fixing shaft, smooth and without holes, notches or hollows for the fitting of external tools. The lower end of the fixing shaft is a screwed end with a screw thread complementary to the inner thread of the screwed hole of the implant or of the replica thereof to which the post is adapted in order to be fixed. The screw thread forms a widening segment, in the radial direction, of the diameter of the fixing shaft and the main body is configured to house and longitudinally slide the fixing shaft of the fixing means therethrough. The lower screwed end of the fixing shaft can be sunk inside the main body or can project from the lower segment thereof, the complete removal of the fixing shaft by simple longitudinally sliding of the fixing shaft with respect to the main body being prevented by a mechanical stop. In this manner, the post is formed by two parts, meaning, by the main body and by the fixing means slidably housed in the main body, such that in the operative scanning position the set of the two parts does not have a through hole or, therefore, a screw crossing through it, and for this reason, the scanning can be performed without distortion or noise.

Furthermore, it is also known that to place a dental prosthesis on an implant previously anchored to the maxillary bone, either the prosthesis is placed directly on the implant, or the prosthesis is arranged on an element that acts as a metal abutment between both of them. The use of abutments, also known as attachments, facilitates making adjustments and enables quality prostheses to be developed with multiple methods and with good results. Examples of abutments for implants are described in patent documents ES2205504, ES2231033, ES2267281 and ES2283051, among many others, describing in some cases abutments with upper end portions having a frustoconical and/or cylindrical configuration.

In addition to the screwed joint, there are also other alternatives for assembling the scanning post on the implant or on the replica thereof, such as for example some designs which enable them to be assembled with contact or pressure, although if the fixing is not screwed in, the position accuracy thereof is highly unreliable.

Thus, it would be desirable to be able to have a simple part for performing the dental scanning by taking advantage of the prior placement of an abutment or attachment on an implant (or the replica thereof) in a simple but accurate manner, preventing problems with distortion and noise.

DESCRIPTION OF THE INVENTION

In order to provide a solution to the problems posed, a cap part for dental scanning is disclosed which is intended to be placed on an abutment or on a dental attachment in order to act jointly with the cap part as a scanning post. The cap part is provided with a cavity for housing at least one essentially cylindrical portion with a circular base of the abutment or of the dental attachment.

Essentially, the cap part object of the invention is characterised in that it is configured by a single body comprising an upper portion formed by a solid head, without holes, hollows or notches, and a lower portion provided with a blind hole at the end opposite from the head which extends in the longitudinal direction of the cap part and forms the cavity for housing at least one cylindrical portion of the abutment or of the dental attachment. Furthermore, the blind hole comprises a retaining segment, the inner wall of which is partially or entirely formed by a concave retaining surface having a cylindrical configuration with an elliptical or oval-shaped base for retaining by embedding an essentially cylindrical portion of the abutment or of the dental attachment in the retaining segment.

According to another feature of the cap part of the invention, the transverse cross section of the retaining segment of the blind hole is entirely or partially an ellipse or oval, the smaller diameter of which is less than the outer diameter of the essentially cylindrical portion of the abutment or of the dental attachment. Furthermore, the larger diameter of said ellipse or oval is larger than the outer diameter of the essentially cylindrical portion of the abutment or of the dental attachment.

Preferably, the smaller diameter of the ellipse or oval which entirely or partially forms the transverse cross section of the retaining segment of the blind hole is between 1.5% and 6% smaller with respect to the outer diameter of the essentially cylindrical portion of the abutment or the dental attachment.

According to an embodiment of the cap part of the invention, especially indicated to be placed on one of the so-called long abutments, the blind hole comprises a secondary segment, the inner wall of which is formed by a cylindrical concave secondary surface with a circular base and a diameter less than or equal to the smaller diameter of the cross section of the retaining segment, the secondary segment being arranged between the retaining segment and the blind bottom of the blind hole. This embodiment of the cap part is especially advantageous to be placed on a "long" abutment, meaning, those which are configured at the upper end thereof by two adjacent cylindrical portions, wherein the lower cylindrical portion of the abutment has a diameter larger than the upper cylindrical portion of the abutment, so that the lower cylindrical portion is housed in the blind hole retaining segment (by embedding) and the upper cylindrical portion of the abutment in the secondary segment of the blind hole wherein there is a positive clearance. The upper cylindrical portion of the long abutment is not fitted or retained in the secondary segment, but the retention of the long abutment only occurs in the retaining segment wherein the lower cylinder of the abutment is embedded. However, this embodiment of the cap part will also be valid if the abutment is short, meaning, if the abutment only has a cylindrical upper portion, because what will happen is that said cylindrical portion will be the one that is housed in the retaining segment, without occupying the secondary segment of the blind hole.

According to another embodiment of the cap part, the inner wall of the retaining segment is partially formed by the concave retaining surface having a cylindrical configuration with an elliptical base, the rest of the inner wall being formed by a flat surface parallel to the longitudinal axis of the cap part and parallel to the direction in which the larger diameter of the ellipse or oval forming the base of the retaining surface extends, and therefore, in said embodiment, the transverse cross section of the retaining segment of the blind hole is an ellipse or an oval truncated at one of the ends with a smaller diameter by a straight line parallel to the direction of the larger diameter of the ellipse or oval. The aforementioned flat surface acts as a reference for the orientation and position of the abutment during scanning, specifically indicating the position of the plane of the abutment and maintaining the parallelism with the flat face of the abutment and with the connection.

The cap part object of the invention is preferably made of polyether ether ketone (PEEK). The use of other materials is not ruled out.

According to another feature of the invention, the head is configured as a spherical surface truncated at the upper end thereof by a plane perpendicular to the longitudinal axis of the cap part, forming a flat upper face, and truncated at one of the sides of the spherical body by a plane parallel to the longitudinal axis of the cap part, forming a flat side face. The flat upper face serves as a reference in the scanning of the depth at which the implant or the replica of the implant is located in the insertion axis thereof, in order to know where and how far it is inserted. In turn, the flat side face (configured as a cut along a vertical plane of the spherical surface) serves as a reference to indicate where the faces of the connection are located, meaning the angular position of the connection of the abutment or of the attachment with respect to the insertion axis thereof.

According to a preferred feature of the invention, the lower portion of the body of the cap part is formed by a cylindrical outer surface body with a circular base, and the lower portion and the upper portion of the body which forms the cap part are joined by a cylindrical neck.

According to another preferred feature of the cap part object of the invention, the end opposite from the head of the lower portion of the body of the cap part has an opening of the blind hole configured internally by a guiding and centring surface comprising a frustoconical segment which connects to the retaining surface of the retaining segment. The frustoconical segment helps to centre the cap part when it is placed on the abutment or attachment.

BRIEF DESCRIPTION OF THE DRAWINGS

The accompanying drawings illustrate, by way of non-limiting example, a preferred embodiment of the cap part object of the invention. In said drawings.

DETAILED DESCRIPTION OF THE DRAWINGS

FIGS. 1 to 6 and also FIGS. 14 to 17 show two embodiments of a cap part 1 for dental scanning intended to be placed on an abutment 100 (such as the ones shown in FIGS. 9 to 12) or on a dental attachment in order to act jointly with the cap part 1 as a scanning post. The cap part 1 is provided with a cavity 2 for housing at least one essentially cylindrical portion 101 with a circular base of the abutment 100 or of the dental attachment. The cap part 1 is made of polyether ether ketone (PEEK).

FIGS. 9-10 and 11-12 show an assembly of the cap part 1 placed on a short and long abutment 100, respectively, in order to act as a scanning post. Both abutments 100 comprise an essentially cylindrical portion 101 with a circular base, with the difference that the long abutment 100 (FIGS. 11 and 12) also comprises, on the essentially cylindrical portion 101, an end portion 102 also having a cylindrical configuration with a circular base, although with a slightly smaller diameter than the essentially cylindrical portion 101. The essentially cylindrical portion 101 with a circular base is limited on the bottom with an annular segment 103 with a larger diameter which marks the transition between the upper portion and the lower portion of the abutment 100. The annular segment 103 can act as support for the cap part 1 since it is located above said segment. As will be explained below, the essentially cylindrical portion 101 with a circular base of the abutment 100 is embedded in a segment of the cavity 2 of the cap part 1 being retained in said segment, thus ensuring that they are fixed to each other and the scanning can then be performed, without needing to use any screws for said fixing.

As seen especially in FIGS. 1 to 6 and 14 to 17, the cap part 1 is configured by a single body comprising an upper portion 11 formed by a solid head 3, without holes, hollows or notches, and a lower portion 12 provided with a blind hole at the end opposite from the head 3.

Figure 1:
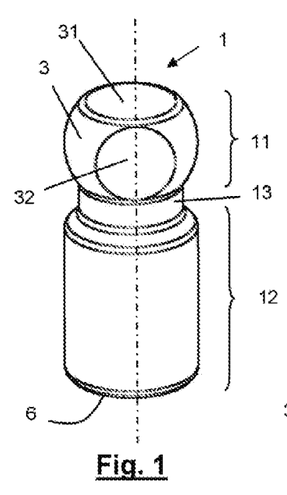
FIGS. 1 and 2 are perspective views from above and below of the cap part object of the invention according to a first embodiment, wherein the inner wall of the retaining segment is partially formed by the concave retaining surface having a cylindrical configuration with an elliptical base, the rest of the inner wall being formed by a flat surface parallel to the longitudinal axis of the cap part and parallel to the direction in which the larger diameter of the ellipse or oval forming the base of the retaining surface extends.
Figure 2:
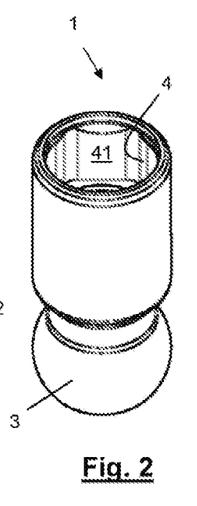
Figure 3:
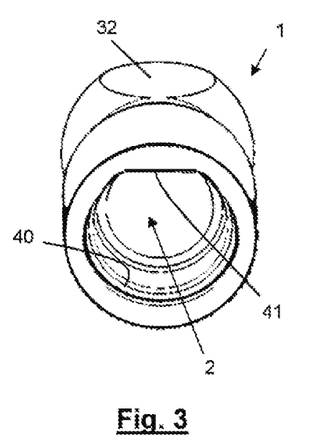
FIGS. 3, 4 and 5 are other perspective views of the cap part shown in FIG. 1.
Figure 4:
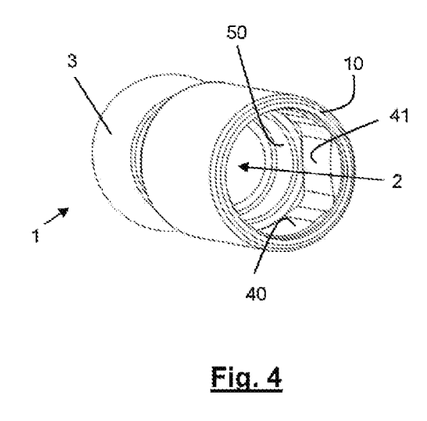
Figure 5:
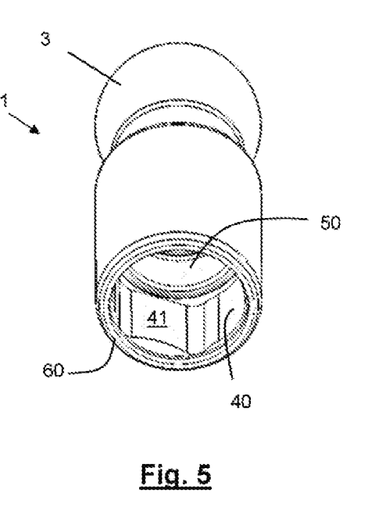
Figure 17:
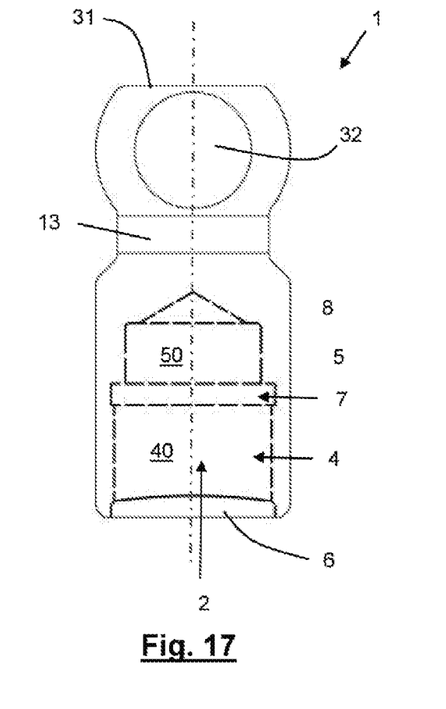
FIG. 17 is a front view of FIG. 16 wherein the different segments of the blind hole have also been drawn as dotted lines.

The head 3 is configured as a spherical surface truncated on the upper end thereof by a plane perpendicular to the longitudinal axis of the cap part 1 forming a flat upper face 31. The longitudinal axis is shown in FIGS. 1 and 17 with a dotted and dashed line. Furthermore, the spherical surface of the spherical body is also truncated on one side by a plane perpendicular to the longitudinal shaft of the cap part 1, forming a flat upper face 32. Both the upper face 31 and the side face 32 act as indicators or a reference for the position of the implant or replica of the implant in the laboratory model and/or of the abutment 100 during the scanning operation. The drawings do not show the implant or the replica thereof, although the implant, or the replica thereof, would be located and connected above the lower portion of the abutment 100. It is also seen that the lower portion 12 of the body of the cap part 1 is configured by a body with a cylindrical outer surface with a circular base, the lower portion 12 and the upper portion 11 being joined by a cylindrical neck 13.

The blind hole which is provided in the lower portion 12 extends in the longitudinal direction of the cap part 1 and forms the cavity 2 for housing at least the essentially cylindrical portion 101 of the abutment 100 or of the dental attachment.

It is noteworthy that this blind hole comprises a retaining segment 4, the inner wall of which is partially (in the embodiment of the cap part 1 of FIGS. 1 to 13) or entirely (in the embodiment of FIGS. 14 to 18) formed by a concave retaining surface 40 having a cylindrical configuration with an elliptical or oval-shaped base for retaining by embedding in the retaining segment 4 of the essentially cylindrical portion 101 of the abutment 100 or of the aforementioned dental attachment.

Figure 18:
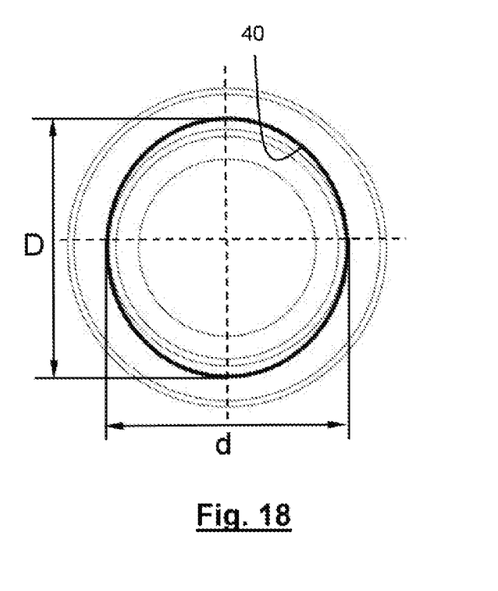
FIG. 18 is a schematic view of the cross section of the cap part of FIG. 14, whereon the larger diameter (D) and the smaller diameter (d) of the ellipse or oval of the cross section of the retaining segment of the blind hole have been indicated, drawing the ellipse or oval as a thicker line for it to be seen better.

As shown in detail in FIG. 18, the transverse cross section of the retaining segment 4 of the blind hole is entirely an ellipse or oval, the smaller diameter d of which is less than the outer diameter of the essentially cylindrical portion 101 of the abutment 100, and the larger diameter D of said ellipse or oval is larger than the outer diameter of the essentially cylindrical portion 101 of the abutment 100. The essentially cylindrical portion 101 of the abutment 100 that is retained by embedding in the retaining segment 4 is the cylindrical portion that is just above the annular segment 103 which marks the transition between the upper portion and the lower portion of the abutment 100. When the abutment 100 is short, such as the one in FIG. 10, the essentially cylindrical portion 101 of the abutment 100 is formed only by the cylinder that has the upper portion, and when the abutment 100 is long, such as the one in FIG. 12, the essentially cylindrical portion 101 of the abutment 100 is not formed by the upper cylinder located at the end or end portion 102, but rather by the lower cylinder, which normally has an outer diameter slightly larger than the upper cylinder of the abutment 100.

Figure 13:
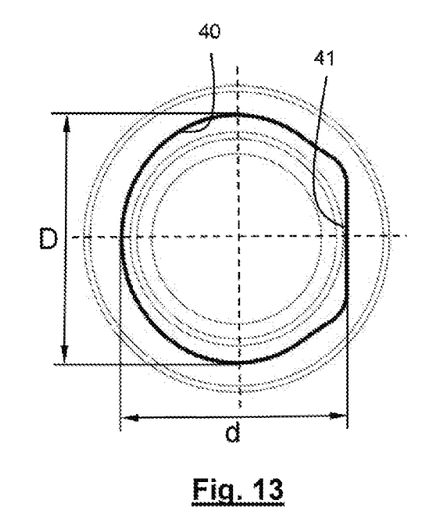
FIG. 13 is a schematic view of the cross section of the cap part of FIG. 1, whereon the larger diameter (D) and the smaller diameter (d) of the ellipse or oval of the cross section of the retaining segment of the blind hole have been indicated, drawing the truncated ellipse or oval as a thicker line for it to be seen better.
Figure 14:
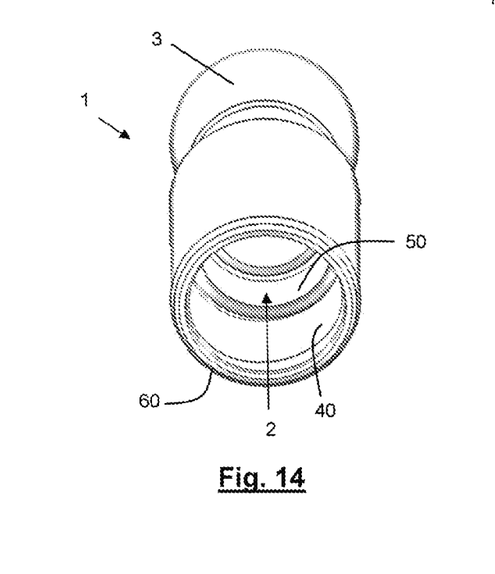
FIGS. 14 and 15 are perspective views similar to FIGS. 5 and 3, respectively, but belonging to a second embodiment of the cap part of the invention, wherein the inner wall of the retaining segment is entirely formed by the concave retaining surface having a cylindrical configuration with an elliptical base, without any flat surface such as in the case of the first embodiment.
Figure 15:
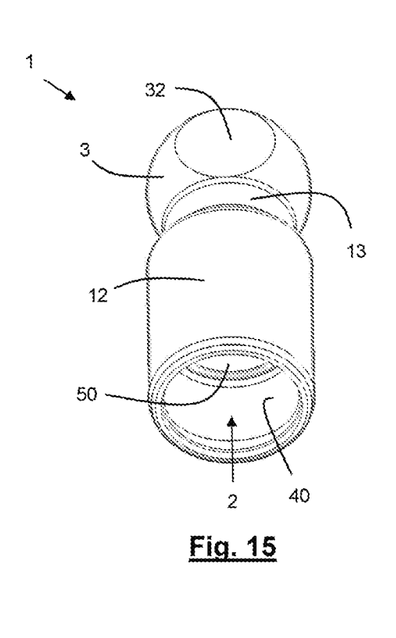
Figure 16:
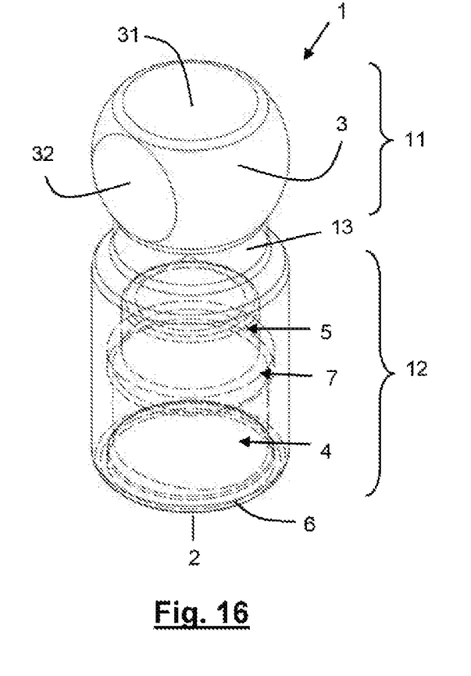
FIG. 16 is a perspective view of the cap part according to the second embodiment shown in FIGS. 14 and 15, wherein several segments of the blind hole that runs through the inside of the part have been drawn as dotted lines.

Instead, in FIG. 13, which corresponds to the first embodiment of the cap part 1 shown in FIGS. 1 to 6, the transverse cross section of the retaining segment 4 of the blind hole is not entirely an ellipse or oval like that of FIG. 18, but rather an ellipse or an oval truncated at one end of the smaller diameter d by a straight line parallel to the direction of the larger diameter D of the ellipse or oval. This is due to the fact that in the first embodiment, the inner wall of the retaining segment 4 is partially formed by the concave retaining surface 40 having a cylindrical configuration with an elliptical base, the rest of the inner wall being formed by a flat surface 41 parallel to the longitudinal axis of the cap part 1 and parallel to the direction in which the larger diameter D of the ellipse or oval forming the base of the retaining surface 40 extends. This flat surface 41 can be seen in FIGS. 2 to 5, and acts as positioning with the abutment 100 which incorporates the flat face.

By way of example, preferably, the smaller diameter d of the ellipse or oval which entirely or partially forms the transverse cross section of the retaining segment 4 of the blind hole is between 1.5% and 6% smaller with respect to the outer diameter of the essentially cylindrical portion 101 of the abutment 100 or of the dental attachment.

By way of example, for the first embodiment of the cap part 1 shown in FIGS. 1 to 6, wherein the transverse cross section of the retaining segment 4 of the blind hole is not entirely an ellipse or oval, the smaller diameter d (see FIG. 13) of the ellipse is between 5% and 5.50% smaller than the outer diameter of the essentially cylindrical portion 101 of the abutment 100 or of the dental attachment, and in a preferred embodiment it is 5.28% smaller. In this case, the smaller diameter d of the ellipse is considered as the distance in the direction perpendicular to the larger diameter D of the ellipse which goes from the flat surface 41 to the opposite side. In contrast, in the second embodiment of the cap part, corresponding to FIGS. 14 to 18, the transverse cross section of the retaining segment 4 of the blind hole is entirely an ellipse or oval, and the smaller diameter d (see FIG. 16) of the ellipse is between 1.5% and 2% smaller than the outer diameter of the essentially cylindrical portion 101 of the abutment 100 or of the dental attachment, and particularly in a preferred embodiment it is 1.74% smaller.

FIGS. 6-8, 16 and 17 show that the blind hole comprises a secondary segment 5, the inner wall of which is formed by a cylindrical concave secondary surface 50 with a circular base and with a diameter less than or equal to the smaller diameter d of the cross section of the retaining segment 4. The secondary segment 5 is arranged between the retaining segment 4 and the blind bottom of the blind hole.

The secondary surface 50 is cylindrical with a diameter smaller than the smaller diameter d of the retaining segment 4, and furthermore there is a positive clearance in this secondary segment 5 because the cylindrical end portion 102 of the long abutment 100 is less than the diameter of the secondary segment 5. The cylindrical end portion 102 of the abutment 100 simply enters in the secondary segment 5 but is not retained in this segment, since said abutment 100 will only be retained by embedding of the essentially cylindrical portion 101 thereof in the retaining segment 4 due to friction with the retaining surface 40.

Figures 6, 7, 8:
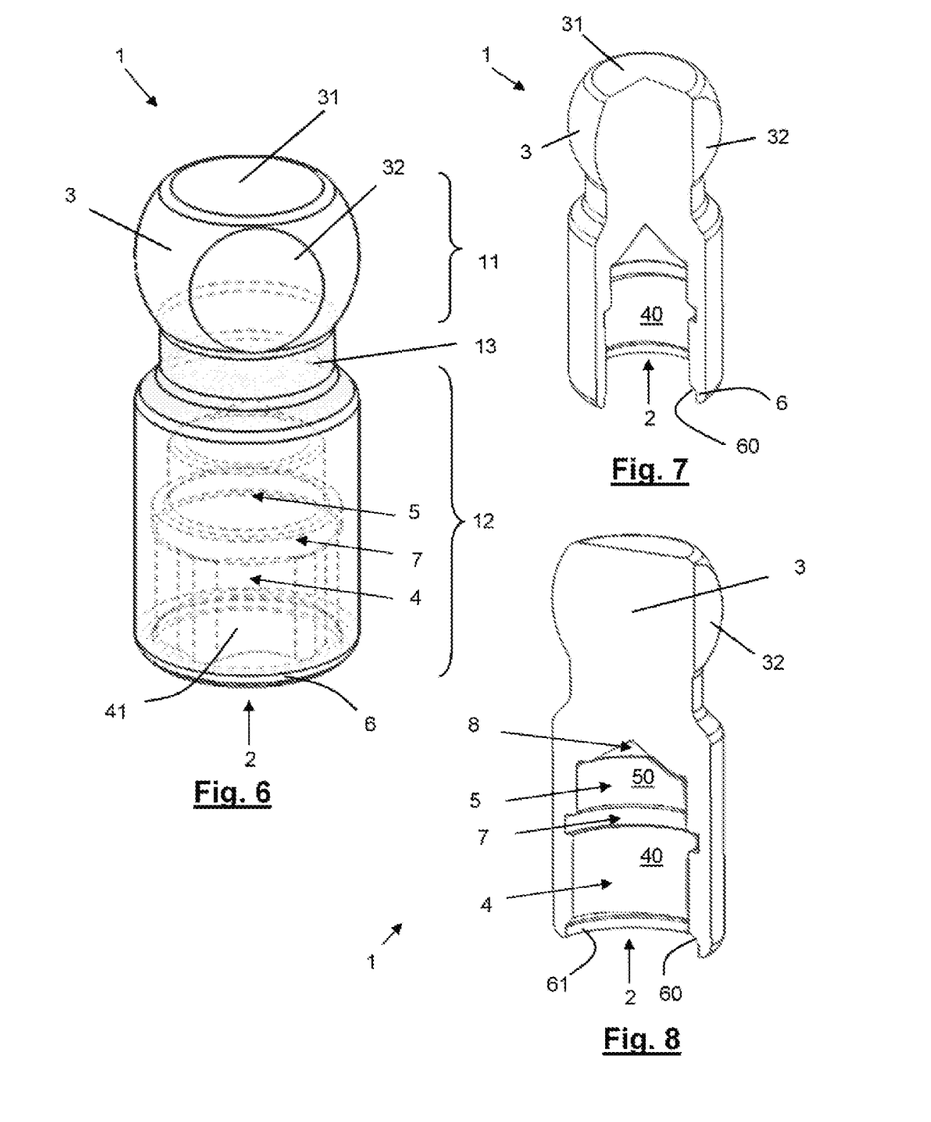
FIG. 6 is a view of the cap part similar to the one shown in FIG. 1 but wherein several segments of the blind hole that runs through the inside of the part have been drawn as dotted lines.
FIGS. 7 and 8 are perspective views of the cap part of FIG. 1 with one fourth and one half removed in order to show the cavity of the blind hole.
Figure 9:
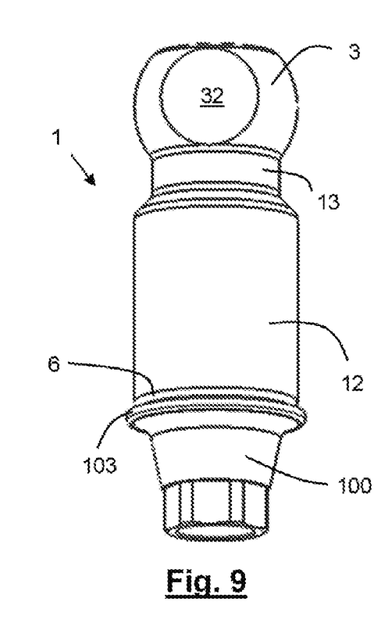
FIGS. 9 and 10 are, respectively, a perspective view and a cross-sectional view of the assembly formed by the cap part of FIG. 1 placed on a short abutment.
Figure 10:
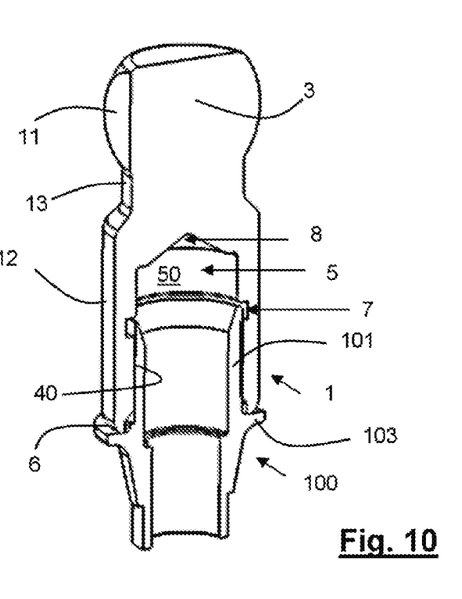
Figure 11:
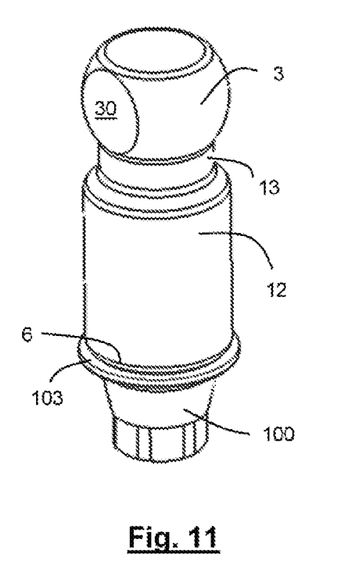
FIGS. 11 and 12 are, respectively, a perspective view and cross-sectional view of the assembly formed by the cap part of FIG. 1 placed on a long abutment.
Figure 12:
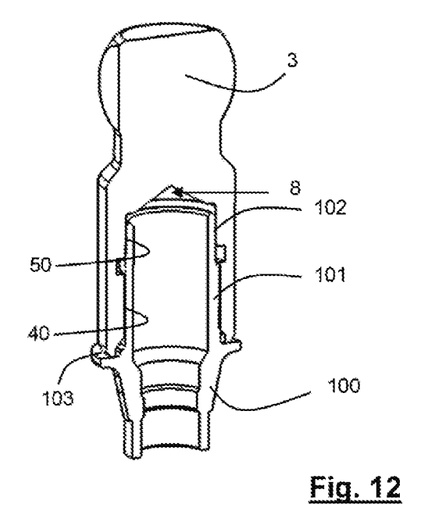

FIGS. 7 and 8 show that between the retaining segment 4 and the secondary segment 5 there is a widening segment 7 and that the bottom of the blind hole, above the secondary segment, is formed by a segment with a conical surface 8. However, said segments only define a particular configuration of the blind hole of the cap part 1, it being able to have a different configuration wherein the secondary segment 5 and the retaining segment 4 are not connected by a widening segment, and wherein the bottom of the blind hole has another shape.

In any of the embodiments, in order to perform the scanning, the operator will place the cap part 1 on top of the abutment 100, causing the essentially cylindrical portion 101 with a circular base to be introduced with pressure into the retaining segment 4 of the blind hole. If the abutment 100 is long, the end portion 102 of the abutment 100 will occupy the secondary segment 5. The elliptical or oval shape of the cross section of the retaining segment 4 allows the retaining segment 4 to tighten, according to the direction of the smaller diameter d to the essentially cylindrical portion 101 of the abutment 100 and at the same time it enables, since the cap part 1 is made of PEEK, a certain distribution of material so that it can expand slightly in the direction of the larger radius D of the ellipse or oval.

In order to facilitate the placement and centring of the cap part 1 on the abutment 100, the end of the lower portion 12 of the cap part opposite from the head 3 has an opening 6 of the blind hole configured internally by a guiding and centring surface 60 comprising a frustoconical segment which connects to the retaining surface 40 of the retaining segment 4.

The invention claimed is:

1. A dental scanning post system, comprising:
a dental abutment or a dental attachment having at least one essentially cylindrical portion with a circular base and an outer diameter; and
cap part for dental scanning configured to be placed on the abutment or on the dental attachment, the cap part provided with a cavity for housing the at least one essentially cylindrical portion with the circular base of the abutment or of the dental attachment, wherein the cap part is a single body comprising an upper portion formed by a solid head, without holes or notches, and a lower portion provided with a blind hole at an end opposite from the head which extends in a longitudinal direction of the cap part and forms the cavity for housing the at least one essentially cylindrical portion of the abutment or of the dental attachment, wherein the blind hole of the lower portion of the cap part comprises a retaining segment, an inner wall of which is partially or entirely formed by a concave retaining surface having a cylindrical configuration with an elliptical or oval-shaped base, wherein a transverse cross section of the retaining segment is entirely or partially an ellipse or oval having a smaller diameter and a larger diameter, the smaller diameter is less than the outer diameter of the at least one essentially cylindrical portion of the abutment or of the dental attachment, and the larger diameter is larger than the outer diameter of the at least one essentially cylindrical portion of the abutment or of the dental attachment, the inner wall configured to retain the abutment or the dental attachment by embedding the at least one essentially cylindrical portion of the abutment or of the dental attachment in the retaining segment, the elliptical or oval shape of the transverse cross section of the retaining segment providing retention of the at least one essentially cylindrical portion of the abutment or of the dental attachment by embedding and tightening said at least one essentially cylindrical portion according to the direction of the smaller diameter of the ellipse or oval.

2. The dental scanning post system according to claim 1, wherein the smaller diameter of the ellipse or oval which entirely or partially forms the transverse cross section of the retaining segment of the blind hole is between 1.5% and 6% smaller with respect to the outer diameter of the essentially cylindrical portion of the abutment or the dental attachment.

3. The dental scanning post system according to claim 1, wherein the blind hole comprises a secondary segment, the inner wall of which is formed by a cylindrical concave secondary surface with a circular base and a diameter less than or equal to the smaller diameter of the cross section of the retaining segment, the secondary segment being arranged between the retaining segment and the bottom of the blind hole.

4. The dental scanning post system according to claim 1, wherein the inner wall of the retaining segment is partially formed by the concave retaining surface having a cylindrical configuration with an elliptical base, the rest of the inner wall being formed by a flat surface parallel to the longitudinal axis of the cap part and parallel to the direction wherein the larger diameter of the ellipse or oval forming the base of the retaining surface extends, and wherein the transverse cross section of the retaining segment of the blind hole is an ellipse or an oval truncated at one of the ends with a smaller diameter by a straight line parallel to the direction of the larger diameter of the ellipse or oval.

5. The dental scanning post system according to claim 1, wherein the cap part is made of polyether ether ketone.

6. The dental scanning post system according to claim 1, wherein the head of the cap part is configured as a spherical surface truncated at the upper end thereof by a plane perpendicular to the longitudinal axis of the cap part, forming a flat upper face, and truncated at one of the sides of the spherical body by a plane parallel to the longitudinal axis of the cap part, forming a flat side face.

7. The dental scanning post system according to claim 1, wherein the lower portion of the body of the cap part is configured by a body with a cylindrical outer surface with a circular base and wherein the lower portion and the upper portion are joined by a cylindrical neck.

8. The dental scanning post system according to claim 1, wherein the end opposite from the head of the lower portion of the body of the cap part has an opening of the blind hole configured internally by a guiding and centring surface comprising a frustoconical segment which connects to the retaining surface of the retaining segment.

* * * * *